No. 779,553. Patented January 10, 1905.

UNITED STATES PATENT OFFICE.

ACHILLE MEYGRET, OF PARIS, FRANCE.

PROTECTIVE COVERING FOR STORAGE-BATTERY PLATES.

SPECIFICATION forming part of Letters Patent No. 779,553, dated January 10, 1905.

Application filed April 6, 1904. Serial No. 201,868.

*To all whom it may concern:*

Be it known that I, ACHILLE MEYGRET, a citizen of the Republic of France, residing at Paris, in the Department of the Seine, France, have invented a certain new and useful Improvement in Protective Coatings or Coverings for Storage-Battery Plates, of which the following is a specification.

This invention relates to storage-battery plates in which the active material is retained in place against becoming loosened and dropping off by a protective coating or covering applied in such manner as to envelop or sheath the plate as a whole. Any form of protective coating or covering can be used; but the coating or covering preferred is one consisting of a solution of tetra acetate of cellulose or a solution of tetra acetate of cellulose and tetra butyrat of cellulose or a solution of tetra butyrat of cellulose or a solution of castor-oil, essence of turpentine and nitrate of cellulose, either one of these several solutions furnishing an envelop or sheath when the plate is dipped into a bath of any one of said solutions.

The object of the present invention is to effectually guard the active material from ill effects in applying the protective coating or covering; and the invention consists in interposing between the active material of the battery-plate and the protective coating or covering a film by which direct contact of the protective coating or covering with the active material of the plate will be prevented and at the same time the protective qualities of the coating or covering will not be impaired, all as hereinafter more specifically described, and pointed out in the claims.

In carrying out the present invention the plate, with the active material thereon, is treated to a bath consisting of a solution which will form a film inclosing the active material, after which the plate with the film is dipped or entered into a bath containing the solution for the protective coating or covering.

The substance or material for the film should be of a soluble nature, so that when in use it will be dissolved by the liquid of the battery, leaving the protective coating or covering still surrounding or sheathing the active material and not adhering firmly thereto, but still being effective in preventing any loosened active material from dropping or falling off, and thus deteriorating or destroying the effectiveness of the battery-plate as a whole. The preferred substance or material for the film is a syrup formed of common lump-sugar or saccharose dissolved in water to such consistency as to furnish a bath into which the grid or metal of the plate, with the active material thereon, can be dipped and have the syrup adhere to the surface of the active material exteriorly and form the film, or the substance or material for the film can be glucose made into a solution to furnish a bath that will produce a film adhering to the exterior surface or face of the active material, or any other substance or material having the quality or characteristic of being dissolvable with liquid can be employed. The plate, with the film of soluble material applied thereto, is then dipped in the solution for the protective coating or covering, and in so dipping the film forms a guard and preventive against the protective coating or covering coming in direct contact with the active material without in any manner interfering with the office of the coating or covering in protecting the active material and holding any loosened portion from dropping or falling off when the battery is in use. The coating or covering of protective material is of a nature to be non-affected by the liquid of the battery; but the interposed film is of a nature to be soluble under the action of the liquid of the battery, and when dissolved this film will disappear without having caused any deleterious combination or any ill effects to the active material and the protective coating or covering, leaving the protective coating or covering in perfect condition as an envelop or sheath for the active material. This interposed film of soluble material furnishes a means for applying the protective coating or covering, with the positive assurance against any adherence that would be injurious to the protective coating or covering or the active material, and this film is self-removable when brought into contact with the liquid of the battery, thus leaving only the metal plate or grid and the active material with the protective coating or covering furnishing an envelop or sheath for the active material, so that the protective coating or covering, which is non-affected by the electrolyte, will prevent the electrolyte from coming into direct contact with the metal of the plate or grid and prolong the life of the battery-plate as a whole, and for the purpose of enabling the electrolyte to reach the active material the protective coating or covering is to be rendered porous or given porosity either by mechanical means or chemically, so as not to destroy the envelop or sheath as a protector in keeping the active matter or material on the supporting surfaces or faces of the plate or grid in case of loosening, and by interposing the soluble film any liability of the protective coating or covering to draw too strongly on the active material is overcome, as with the dissolving of the interposed film the protective coating or covering while enveloping or sheathing the active material is not liable to draw and affect the retaining of the active material on the metal plate or grid.
What I regard as new, and desire to secure by Letters Patent, is—

1. In a battery-plate, the combination of a retaining-base, an active material applied to the base, and a soluble film surrounding the base and active material, and furnishing a separation in applying a protective coating or covering to envelop the active material, substantially as described.

2. A storage-battery plate consisting of a metal body and active material, a protective coating or covering enveloping the active material, and a soluble film interposed between the protective coating or covering and the active material, substantially as described.

3. The process herein described of protecting the active material of battery-plates, which consists in first dipping the plate with the active material thereon into a solution of soluble material, to form a soluble film on exterior face of the active material and then dipping the plate with the film thereon into a solution furnishing a protective coating or covering, whereby the soluble film is interposed between the active material and the coating or covering, substantially as described.

ACHILLE MEYGRET.

Witnesses:
   CHAS. A. WHITING,
   A. P. LORD.